(12) United States Patent
Foo et al.

(10) Patent No.: US 8,514,565 B2
(45) Date of Patent: Aug. 20, 2013

(54) SOLID STATE STORAGE DEVICE WITH REMOVABLE POWER BACKUP

(75) Inventors: Boon Khian Foo, Penang (MY); Rajan Bhakta, Costa Mesa, CA (US); Mark Moshayedi, Newport Coast, CA (US)

(73) Assignee: STEC, Inc., Santa Ana, CA (US)

( * ) Notice: Subject to any disclaimer, the term of this patent is extended or adjusted under 35 U.S.C. 154(b) by 299 days.

(21) Appl. No.: 12/842,930

(22) Filed: Jul. 23, 2010

(65) Prior Publication Data

US 2012/0236489 A1 Sep. 20, 2012

Related U.S. Application Data

(60) Provisional application No. 61/228,132, filed on Jul. 23, 2009.

(51) Int. Cl.
*G06F 1/16* (2006.01)
*H05K 1/14* (2006.01)
*H05K 1/18* (2006.01)

(52) U.S. Cl.
USPC ....... 361/679.32; 361/738; 361/763; 361/764

(58) Field of Classification Search
USPC .............. 361/72, 679.32, 679, 683, 686, 756, 361/785, 809, 679.02, 679.31, 679.58, 760, 361/784, 763, 764, 738; 439/59, 61, 62, 439/74, 377; 710/300, 301, 107, 100, 110; 312/223.1, 223.2; 320/5, 30, 31, 35, 39, 320/43, 48, 49, 158, 132, 148, 149, 161, 320/162, 145, 152, 60, DIG. 10, 163; 340/635, 340/636; 429/61, 90; 324/426, 427, 433

See application file for complete search history.

(56) References Cited

U.S. PATENT DOCUMENTS

| | | | | |
|---|---|---|---|---|
| 5,633,573 | A * | 5/1997 | van Phuoc et al. | 320/128 |
| 7,103,694 | B2 * | 9/2006 | Schumacher et al. | 710/300 |
| 7,672,141 | B2 * | 3/2010 | Middleton et al. | 361/785 |
| 2001/0044281 | A1 * | 11/2001 | Peterzell et al. | 455/90 |
| 2008/0153336 | A1 * | 6/2008 | McEwan et al. | 439/327 |

\* cited by examiner

*Primary Examiner* — Hoa C Nguyen
*Assistant Examiner* — Binh Tran
(74) *Attorney, Agent, or Firm* — McDermott Will & Emery LLP (57) ABSTRACT

A solid state storage device includes a printed circuit board assembly, a memory arranged on the printed circuit board assembly, and a storage medium arranged on the printed circuit board assembly. The storage device further includes a processor arranged on the printed circuit board assembly, wherein the processor is coupled to the memory and to the storage medium via the printed circuit board assembly, and wherein the processor is configured to store data in the memory and the storage medium and to read data from the memory and the storage medium. The storage device further includes a removable power pack comprising a plurality of capacitors serially arranged in a housing, wherein the plurality of capacitors is detachably connected to the printed circuit board assembly to supply backup power to the processor, the memory, and the storage medium when the removable power pack is mounted in the solid state storage device.

22 Claims, 6 Drawing Sheets

SOLID STATE STORAGE DEVICE WITH REMOVABLE POWER BACKUP

This application claims the benefit of U.S. Provisional Application Ser. No. 61/228,132, filed on Jul. 23, 2009, which is hereby incorporated by reference herein.

BACKGROUND

The subject application relates to solid state storage devices and, in particular, solid state storage devices having backup power systems.

Solid state storage devices using flash memory provide performance and power consumption advantages over conventional hard drives. To further improve performance, many solid state storage devices are incorporating and using volatile memory, such as dynamic random access memory (DRAM) or static random access memory (SRAM), in addition to flash memory. For example, volatile memory may be used to cache data and/or temporarily store tables used to manage the data stored in flash memory. Unlike flash memory, however, volatile memory requires power to maintain the data stored therein. If power is interrupted, any data stored in volatile memory may be lost. This data loss may increase overhead operations in a solid state storage device by requiring lost tables to be reconstructed. Furthermore, this data loss may result in permanently losing cached data that had not been stored in flash memory prior to the power interruption. Furthermore, a power interruption may prevent a write operation to flash memory from completing resulting in lost or corrupt data in the flash memory.

SUMMARY

According to one aspect of the subject technology, a solid state storage device is described. The solid state storage device includes a printed circuit board assembly, a memory arranged on the printed circuit board assembly, and a storage medium arranged on the printed circuit board assembly. The storage device further includes a processor arranged on the printed circuit board assembly, wherein the processor is coupled to the memory and to the storage medium via the printed circuit board assembly, and wherein the processor is configured to store data in the memory and the storage medium and to read data from the memory and the storage medium. The storage device further includes a removable power pack comprising a plurality of capacitors serially arranged in a housing, wherein the plurality of capacitors is detachably connected to the printed circuit board assembly to supply backup power to the processor, the memory, and the storage medium when the removable power pack is mounted in the solid state storage device.

According to another aspect of the subject technology, a solid state storage device is described. The storage device includes a printed circuit board assembly, a memory arranged on the printed circuit board assembly, and a storage medium arranged on the printed circuit board assembly. The storage device further includes a processor arranged on the printed circuit board assembly, wherein the processor is coupled to the memory and to the storage medium via the printed circuit board assembly, and wherein the processor is configured to store data in the memory and the storage medium and to read data from the memory and the storage medium, and a plurality of capacitors serially arranged and connected to the printed circuit board assembly to supply backup power to the processor, the memory, and the storage medium. A monitor circuit is configured to monitor a voltage at a positive plate of each of the plurality of capacitors.

According to another aspect of the subject technology, a solid state storage device is described. The storage device includes a printed circuit board assembly, a memory arranged on the printed circuit board assembly, and a storage medium arranged on the printed circuit board assembly. The storage device further includes a processor arranged on the printed circuit board assembly, wherein the processor is coupled to the memory and to the storage medium via the printed circuit board assembly, and wherein the processor is configured to store data in the memory and the storage medium and to read data from the memory and the storage medium, and a plurality of capacitors serially arranged and connected to the printed circuit board assembly to supply backup power to the processor, the memory, and the storage medium. An active balance network is configured to equalize the respective voltages across the plurality of capacitors. The active balance network includes a first plurality of resistors arranged in a first voltage divider circuit configured to equally divide the total voltage across the plurality of capacitors, and a plurality of op amps configured as voltage followers. The output of each of the plurality of op amps is coupled to a respective terminal connecting two adjacent capacitors, and an input of each of the plurality of op amps is coupled to a respective terminal connecting two adjacent resistors in the first voltage divider circuit.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
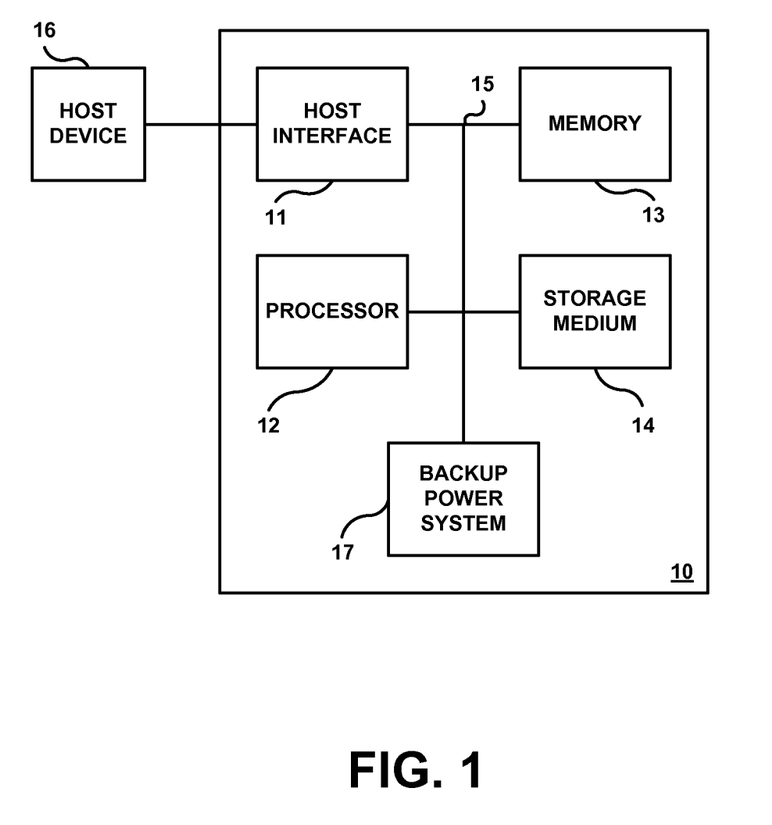
FIG. 1 is a block diagram depicting components of a solid state storage device according to one aspect of the subject technology.

FIG. 1 is a block diagram depicting components of a solid state storage device according to one aspect of the subject technology. As depicted in FIG. 1, solid state storage device 10 includes host interface 11, processor 12, memory 13, storage medium 14, and bus 15. Host interface 11 is configured to connect host device 16 to storage device 10. In response to commands received from host device 16 via host interface 11, processor 12 may store data received from host device 16 in storage medium 14 or may read data from storage medium 14 and send the data to host device 16. Memory 13 provides temporary storage for processor 12 to use while executing commands from host device 16 and while managing the operation of storage device 10. Bus 15 represents one or more buses for communicating data, address, and control signals between components of storage device 10.

As noted above, host interface 11 is configured to connect host device 16 to storage device 10. Host interface 11 may include both electrical and physical connections for coupling storage device 10 to host device 16. Host interface is further configured to communicate data, address, and control signals between host device 16 and storage device 10. Host interface 11 may be configured to implement a standard interface, such as Serial-Attached SCSI (SAS), Fiber Channel Interface, PCI Express (PCIe), etc. The subject technology is not limited to any particular interface for communicating with host device 16.

Host device 16 represents any device configured to be coupled to storage device 10 and to store data in storage device 10. Host device 16 may be a computing system such as a personal computer, a server, a workstation, a laptop computer, etc. Alternatively, host device may be another type of electronic device such as a digital camera, a digital audio player, a digital video recorder, etc.

Processor 12 is configured to monitor and control the operation of components within storage device 10 while executing commands received from host device 16. Processor 12 is configured to execute code or instructions to perform the operations and functionality described herein. One or more sequences of instructions may be firmware stored on ROM within processor 12 or elsewhere within storage device 10. One or more sequences of instructions may be software stored and read from memory 13, storage medium 14, or received from host device 16. Processor 12 may be implemented using one or more processors. Processor 12 may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Storage medium 14 represents a non-volatile storage medium for storing data. According to one aspect of the subject technology, storage medium 14 comprises flash memory such as NAND flash memory. Storage medium 14 may comprise a single flash memory device or chip, or it may include multiple flash memory devices or chips arranged in one or more channels. The flash memory is not limited to any particular capacity or configuration. For example, the number of physical blocks, the number of physical pages per physical block, the number of sectors per physical page, and the size of the sectors may vary within the scope of the subject technology.

Memory 13 represents volatile memory used to temporarily store data and information used to manage storage device 10. For example, processor 12 may cache data read from and/or written to storage medium 14. In addition, processor 12 may maintain and keep copies of addressing/mapping tables used to manage data stored in storage medium 14. According to one aspect of the subject technology, memory 13 is random access memory (RAM) such as double data rate (DDR) RAM. Other types of RAM also may be used to implement memory 13. Memory 13 may be implemented using a single RAM module or multiple RAM modules.

Power to operate storage device 10 may be supplied by host device 16 or may be supplied by a different external power source. If power being supplied to storage device 10 is interrupted, a number of problems may occur within storage device 10. For example, anything stored in volatile memory will be lost if the power supplied to the volatile memory is interrupted. Accordingly, any data cached in memory 13 and any table stored in memory 13 would be lost in the event of a power interruption or failure. In addition, if storage medium 14 were in the middle of a write operation, either in response to a write command received from host device 16 or during a maintenance operation executed by processor 12, the data being written may be corrupted within storage medium 14 if the write operation is not allowed to complete before power is lost.

Backup power system 17 represents a temporary power source internal to storage device 10 that is configured to supply power to components within storage device 10 for a period of time following a loss of power being supplied to storage device 10. During the period of time, processor 12 may be configured to flush any cached data in memory 13 to storage medium 14 as well as write any tables maintained in memory 13 to storage medium 14. In addition, storage medium 14 may be allowed to complete any write operations during the period of time. The operation and arrangement of backup power system 17 is described in further detail below.

According to one aspect of the subject technology, backup power system 17 includes an array of capacitors capable of being charged with sufficient energy to allow the operations described above to be completed in the event that power to storage device 10 is lost or interrupted. The capacitors may be electrochemical capacitors (i.e., super capacitors) arranged and interconnected in a serial configuration. Connecting the array of capacitors serially allows the total voltage stored in the array to be higher than the capacitors can individually hold without damaging the capacitors.

Capacitors are prone to degradation over time. Depending on the quality of the capacitors and the operating conditions under which the capacitors are used, the useful lifespan of the capacitors may be shorter than other components of storage device 10. Furthermore, capacitors are typically soldered to an internal circuit board making them difficult to access and replace in the event of failure. To address these difficulties, backup power system 17 includes a removable power pack that includes a capacitor array serially arranged within a housing. When mounted in storage device 10, the capacitor array is detachably connected to components within storage device 10 and backup power system 17 is configured to supply backup power to the components (e.g., processor 12, memory 13, storage medium 14, etc.) for a period of time in the event of power interruption or loss.

Figure 2:
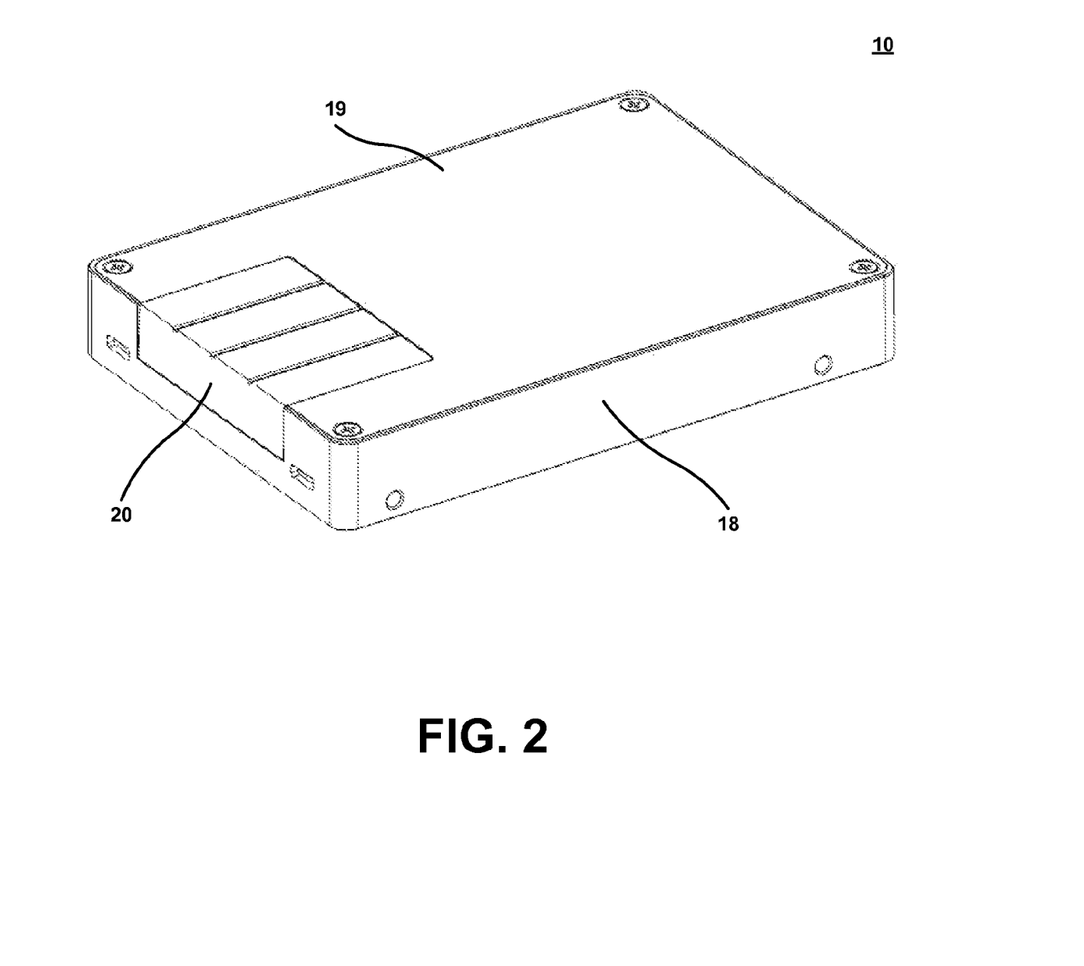
FIG. 2 is a perspective view of a solid state storage device according to one aspect of the subject technology.

FIG. 2 is a perspective view of a solid state storage device according to one aspect of the subject technology. As depicted in FIG. 2, solid state storage device 10 includes frame base 18, frame cover 19, and removable power pack 20. The arrangement and structure of these components is described below in connection with FIGS. 3-5.

Figure 3:
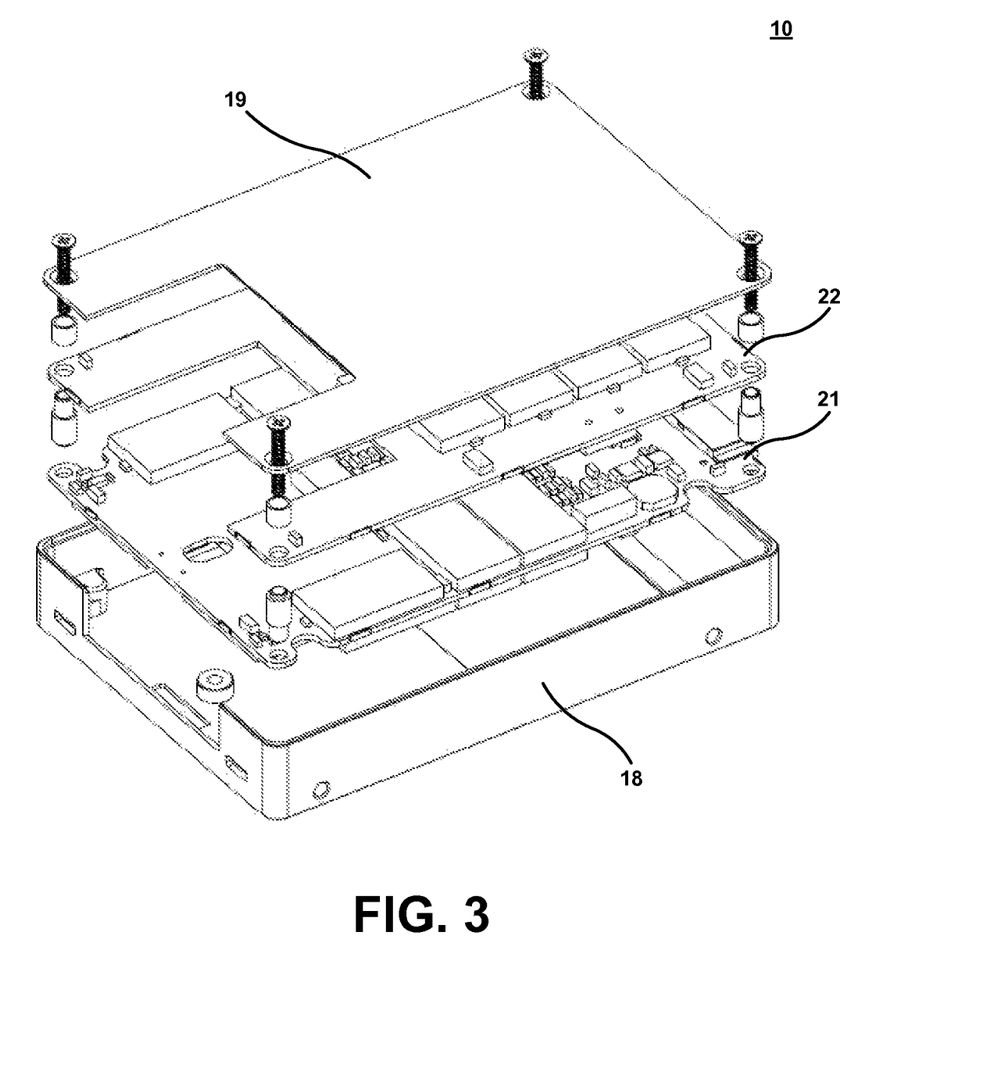
FIG. 3 is an exploded view of a solid state storage device with a removable power pack removed according to one aspect of the subject technology.

FIG. 3 is an exploded view of storage device 10 with removable power pack 20 removed according to one aspect of the subject technology. As shown in FIG. 3, storage device 10 includes motherboard 21 and daughterboard 22 in addition to frame base 18 and frame cover 19. Motherboard 21 and daughterboard 22 together form a printed circuit board assembly. Electrical components of storage device 10 are arranged on either motherboard 21 or daughterboard 22. For example, host interface 11, processor 12, memory 13, and storage medium 14 are arranged on either motherboard 21 or daughterboard 22. In addition to these components, motherboard 21 and daughterboard 22 may include one or more metal layers forming traces for supplying power and communicating signals between the components arranged thereon. While FIG. 3 depicts the printed circuit board assembly as including motherboard 21 and daughterboard 22, the subject technology is not limited to this arrangement. For example, printed circuit board assembly may be implemented using a single printed circuit board, such as motherboard 21, or may be implemented using more than two printed circuit boards, such as multiple daughterboards 22 used together with motherboard 21.

As can be seen in FIGS. 2 and 3, when frame cover 19 is attached to frame base 18, motherboard 21, daughterboard 22, and the various components arranged thereon are partially enclosed. Both frame cover 19 and frame base 18 are depicted with notches that when assembled define an opening. This opening provides space to detachably mount power pack 20 in storage device 10.

Figure 4:
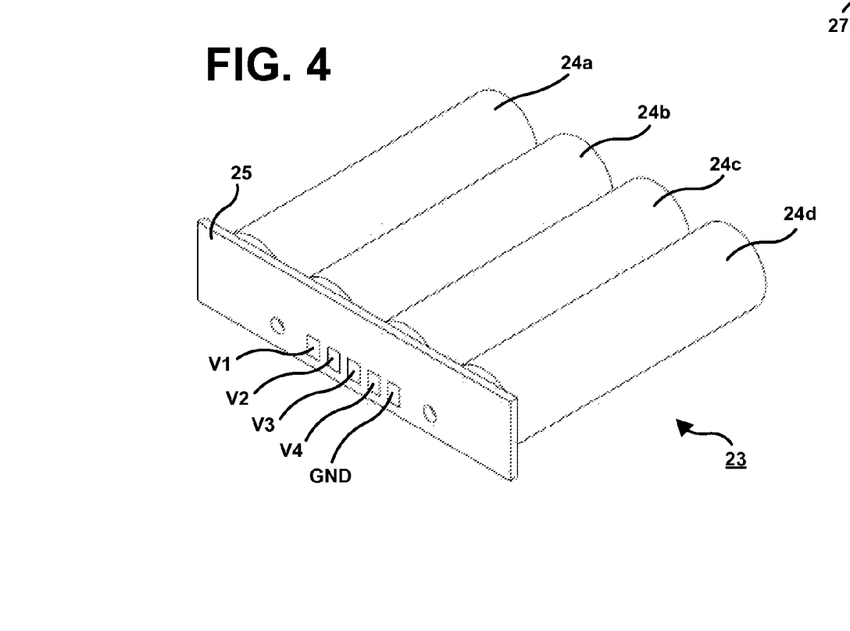
FIG. 4 is a perspective view of a capacitor array according to one aspect of the subject technology.
Figure 5:
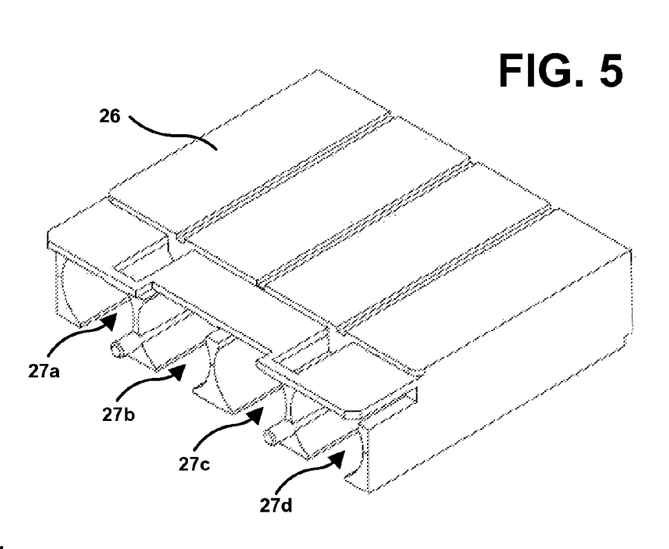
FIG. 5 is a perspective view of a housing for a capacitor array according to one aspect of the subject technology.

Power pack 20 includes an array of capacitors and a housing in which the capacitor array is arranged. FIG. 4 depicts a capacitor array and FIG. 5 depicts a housing according to one aspect of the subject technology. As depicted in FIG. 4, capacitor array 23 includes four capacitors 24a-24d mounted on and connected to mounting circuit board 25. Capacitors 24a-24d may be electrochemical capacitors with identical capacities (e.g., 10 farads). Each of capacitors 24a-24d may be connected to mounting circuit board 25 using solder or other conventional techniques for mounting components on a circuit board. Mounting circuit board 25 may include one or more metal layers forming traces for connecting capacitors 24a-24d in a serial arrangement and to provide electrical connectors to the serially arranged capacitors 24a-24d. For example, the positive plate of capacitor 24a may be electrically connected via circuit board 25 to a connector designated V1; the negative plate of capacitor 24a and the positive plate of capacitor 24b may be electrically connected via circuit board 25 to a connector designated V2; the negative plate of capacitor 24b and the positive plate of capacitor 24c may be electrically connected via circuit board 25 to a connector designated V3; the negative plate of capacitor 24c and the positive plate of capacitor 24d may be electrically connected via circuit board 25 to a connector designated V4; and the negative plate of capacitor 24d may be electrically connected via circuit board 25 to a connector designated ground. Connectors V1-V4 may be contact pads or other structures such as pogo pins for making electrical contact with corresponding contact structures on the printed circuit board assembly (i.e., motherboard 21 and/or daughterboard 22) in storage device 10 when power pack 20 is mounted therein.

While FIG. 4 depicts capacitor array 23 as containing four capacitors, the subject technology is not limited to this number. Capacitor array 23 may be implemented with more than four capacitors or less than four capacitors without departing from the scope of the subject technology. In addition, the capacitors may be arranged in other configurations besides the linear row depicted in FIG. 4.

FIG. 5 depicts a housing configured to hold capacitor array 23 according to one aspect of the subject technology. As depicted in FIG. 5, housing 26 defines four cavities 27a-27d. Cavities 27a-27d are configured to receive capacitors 24a-24d, respectively. Cavities 27a-27d may be of sufficient size to receive capacitors 24a-24d such that circuit board 25 comes into contact with housing 26 at the openings of cavities 27a-27d thereby at least partially enclosing capacitors 24a-24d therein. Housing 26 may be made of a plastic material which may at least partially insulate capacitors 24a-24d from heat generated within storage device 10 during operation. This provides a significant advantage over conventional solutions that mount capacitors directly on the main circuit boards within a storage device, thereby subjecting the capacitors to damaging heat generated by other components mounted on the circuit boards.

While FIG. 5 depicts cavities 27a-27d as having slots extending down the sides, the subject technology is not limited to this configuration. The thickness of the sidewalls defining the cavities may vary depending on the dimensions and product specifications for the components of the storage device. Certain form factors may allow for thicker sidewalls in the housing, which will further increase the insulative function provided by the housing for the capacitors arranged therein.

Capacitor array 23 may be mounted and secured to storage device 10 independent of housing 26. For example, capacitor array 23 may have mounting structures, such as fastener holes or alignments holes arranged in circuit board 25 that correspond to fastening structures in frame base 18, motherboard 21, and/or daughterboard 22. Once mounted in storage device 10, housing 26 may slide over capacitor array 23 to at least partially enclose the capacitors. Alternatively, capacitor array 23 may be secured to housing 26 using fastening structures aligned with faster holes or alignment holes on circuit board 25. The two components, together forming power pack 20 may then be detachably mounted in storage device 10 using any of a number of techniques known to those skilled in the art to secure power pack 20 to storage device 10.

As described above, power pack 20 provides a field-replaceable unit allowing an operator or user to relatively quickly and easily remove power pack 20 in the event that one or more of the capacitors has excessively degraded in performance, and replace power pack 20 with a new power pack. Because the capacitors are not soldered to motherboard 21 and/or daughterboard 22, and because frame base 18 and frame cover 19 are configured to provide an opening for power pack 20, the replacement of faulty capacitors is significantly simplified compared to conventional systems.

Figure 6:
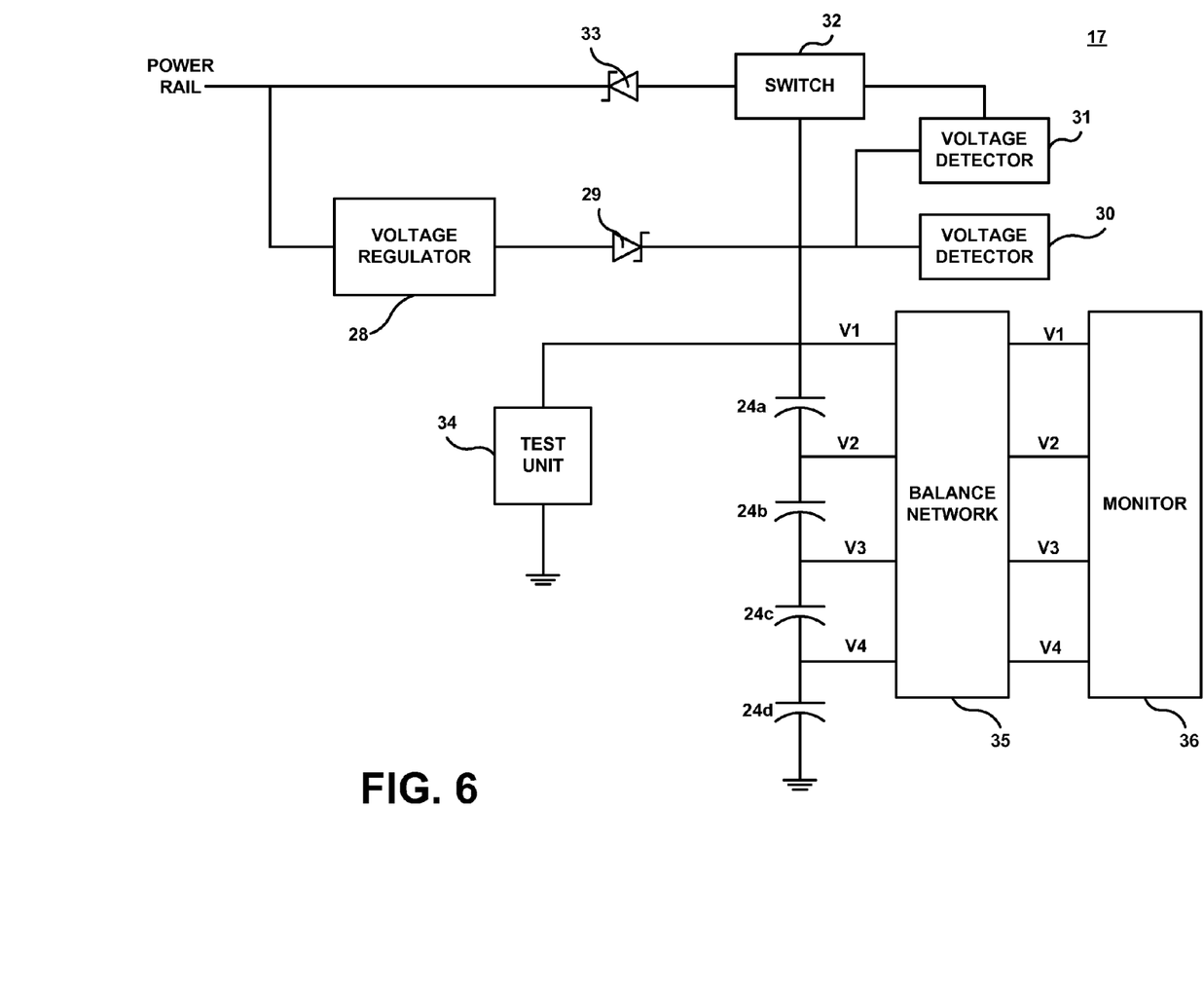
FIG. 6 is a block diagram illustrating electrical components of a backup power system according to one aspect of the subject technology.

The operation of backup power system 17 will now be described in connection with FIG. 6. FIG. 6 is a block diagram illustrating electrical components of backup power system 17 according to one aspect of the subject technology. As depicted in FIG. 6, the electrical components of backup power system 17 include voltage regulator 28, diode 29, voltage detectors 30 and 31, switch 32, diode 33, test unit 34, balance network 35, and monitor 36, in addition to capacitors 24a-24d. These components may be mounted and connected to motherboard 21 and/or daughterboard 22, which are detachably connected to capacitors 24a-24d mounted and connected to circuit board 25. Those skilled in the art will recognize that one or more of the components listed above may be mounted and connected to circuit board 25 rather than to motherboard 21 or daughterboard 22.

Backup power system 17 is electrically connected to a main power rail supplying power to storage device 10. The main power rail may supply a voltage, 12 volts for example, which is subsequently converted to the various voltages levels required within storage device 10 by one or more power management circuits. With respect to backup power system 17, the voltage supplied by the main power rail is reduced by voltage regulator 28 to a desired voltage for charging the serially connected capacitors 24a-24d. Diode 29 is arranged to prevent capacitors 24a-24d from discharging back through voltage regulator 28. Voltage regulator 28 may be a switching regulator activated by a charge-enable signal generated by processor 12.

Voltage detector 30 is configured to detect the voltage at the positive plate of capacitor 24a, which represents the total voltage across the capacitor array. When the voltage across the capacitor array reaches a threshold value, signifying that the capacitor array is fully charged, voltage detector 30 generates a signal for processor 12 to indicate that the charged voltage across the capacitor array has reached the threshold. This threshold may be set between 8.5 volts and 8.3 volts for a target charge value of 8.8 volts across the capacitor array. The subject technology is not limited to these values.

When switch 32 is turned on by processor 12, the capacitor array can discharge into the main power rail. In this manner, the capacitor array can supply backup power to components within storage device 10 in the event of a power interruption or failure. Diode 33 prevents the main power rail from charging the capacitor array directly should switch 32 be on when power is still being supplied to storage device 10 by an external source. Voltage detector 31 is configured to detect the voltage at the positive plate of capacitor 24a, which represents the total voltage across the capacitor array. When the detected voltage drops below a threshold value, voltage detector 31 is configured to either alert processor 12 to turn switch 32 off or voltage detector 31 is configured to turn switch 32 off itself. The threshold value for voltage detector 31 may be 4.1 volts. The subject technology is not limited to this value.

Test unit 34 is electrically connected to the positive plate of capacitor 24a and is configured to place a load similar to the load exerted by the components within storage device 10 during normal operation across the capacitor array. Test unit 34 is enabled by a test signal generated by processor 12.

Within the capacitor array it is not only important to limit the total voltage charged across the entire array, but also to monitor and limit the voltage applied to the individual capacitors. While voltage regulator 28 is configured to limit the total voltage applied across the entire array, balance network 35 is configured to equalize the voltage for each of capacitors 24a-24d. Balance network 35 will be described further in connection with FIG. 7.

Figure 7:
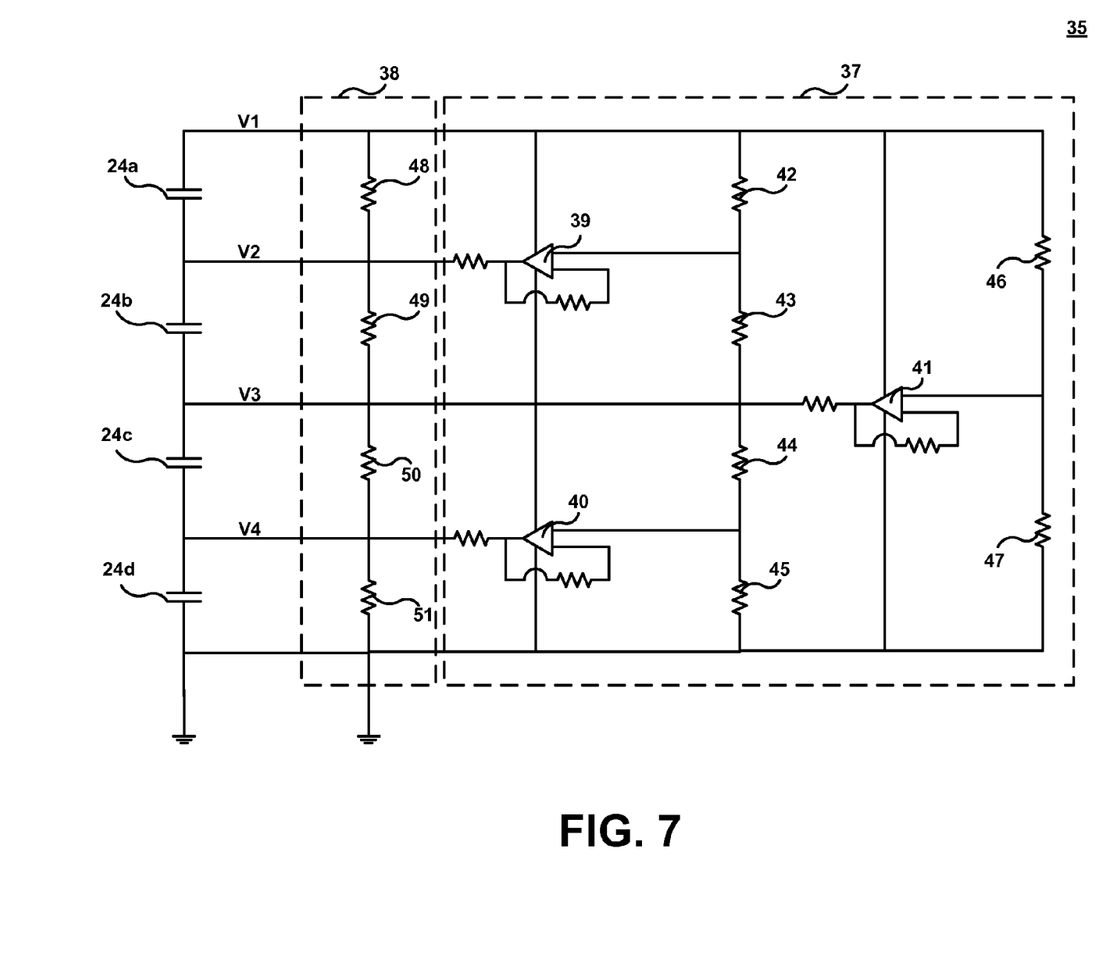
FIG. 7 is a circuit diagram illustrating a balance network according to one aspect of the subject technology.

As shown in FIG. 7, balance network 35 includes active balance network 37 and passive balance network 38. Active balance network 37 utilizes active components to drive the voltages at each of capacitors 24a-24d to a desired level. According to one aspect of the subject technology, the active elements may be operational amplifiers (op amps) 39-41 configured as voltage followers. To set the desired level driven by each of op amps 39-41, active balance network 37 utilizes a voltage divider circuit to divide the total voltage across the capacitor array. According to one aspect of the subject technology, resistors 42-45 are arranged serially to form one voltage divider and resistors 46 and 47 are arranged serially to form another voltage divider, the two voltage dividers comprising a voltage divider circuit.

According to one aspect of the subject technology, resistors 46 and 47 have equal resistance values and resistors 42-45 have equal resistance values. As shown in FIG. 7, the input of op amp 41 not connected to the feedback loop is coupled to a terminal between resistors 46 and 47. As resistors 46 and 47 have equal resistance values, the voltage applied to this input of op amp 41 is 50% of the total voltage applied across the capacitor array. The output of op amp 41 is coupled to a terminal connecting the positive plate of capacitor 24c and the negative plate of capacitor 24b. Accordingly the voltage at this terminal in the capacitor array is driven to be 50% of the total voltage across the array.

Similarly, the input of op amp 39 not connected to the feedback loop is coupled to a terminal between resistors 42 and 43 and the input of op amp 40 not connected to the feedback loop is coupled to a terminal between resistors 44 and 45. As resistors 42-45 have equal resistance values, the voltage applied to the input of op amp 39 is 75% of the total voltage across the capacitor array and the voltage applied to the input of op amp 40 is 25% of the total voltage across the capacitor array. The output of op amp 39 is coupled to a terminal connecting the positive plate of capacitor 24b to the negative plate of capacitor 24a and drives this terminal to 75% of the total voltage across the capacitor array. The output op amp 40 is coupled to a terminal connecting the positive plate of capacitor 24d to the negative plate of capacitor 24c and drives this terminal to 25% of the total voltage across the capacitor array. Rather than simply balancing pairs of capacitors against each other, the active balance network of the subject technology balances each capacitor individually against a percentage of the total voltage across the capacitor array. This further mitigates against the possibility of applying too much voltage to any one capacitor and damaging that capacitor or causing it to fail altogether.

In combination with the active balance network 37, passive balance network 38 further balances the voltages applied to the individual capacitors in the capacitor array. As shown in FIG. 7, passive balance network 38 includes resistors 48-51 serially arranged as a voltage divider. Resistors 48-51 each have the same resistance value and are arranged in parallel with respective ones of capacitors 24a-24d. Accordingly, the voltage divider circuit formed by resistors 48-51 equally divides the voltage across the entire capacitor array among the individual capacitors.

Returning to FIG. 6, backup power system 17 further includes monitor circuit 36. Monitor circuit 36 is configured to monitor the voltage at the positive plate of each of capacitors 24a-24d. According to one aspect of the subject technology, monitor circuit 36 includes an analog-to-digital converter that samples these voltages via connectors V1-V4 and generates a fault signal for processor 12 if it detects an imbalance in the individual voltages across capacitors 24a-24d. Monitor circuit 36 may sample the voltages via balance network 35 or via a more direct set of connections. In the arrangement described above, the voltage at the positive plate of capacitor 24a is ideally 100% of the total voltage across the array, the voltage at the positive plate of capacitor 24b is ideally 75% of the total voltage across the array, the voltage at the positive plate of capacitor 24c is ideally 50% of the total voltage across the array, and the voltage at the positive plate of capacitor 24d is ideally 25% of the total voltage across the array. For purposes of comparing these voltages to determine an imbalance, monitor circuit 36 may include voltage dividers at respective inputs of the analog-to-digital converter to standardize the voltages. For example, a first voltage divider may be configured to take ¼ of the voltage at capacitor 24a, a second voltage divider may be configured to take ⅓ of the voltage at capacitor 24b, and a third voltage divider may be configured to take ½ of the voltage at capacitor 24c, and to allow comparison of these divided voltages with the voltage at capacitor 24d.

Processor 12 is configured to execute one or more sequences of instructions to monitor and control backup power system 17. The one or more sequences of instructions may be stored in firmware within processor 12 or storage device 10. At power-up, processor 12 enables voltage regulator 28 to charge the capacitor array. After enabling voltage regulator 28, processor 12 waits for a period of time for voltage detector 30 to assert a signal indicating that the capacitor array is fully charged. This initial period of time may be 45 seconds, for example. If after this initial period of time, voltage detector 30 does not detect a voltage beyond the set threshold value, a fault condition is reported by processor 12. The fault condition may be reported by processor 12 sending a fault message to host device 16. Alternatively, the fault condition may be reported using a fault LED arranged on storage device 10.

During operation of storage device 10, processor 12 regularly checks for the presence of a fault signal generated by monitor circuit 36 in response to detecting an imbalance within the capacitor array. For example, processor 12 may check for the signal every 1 second during operation, but the subject technology is not limited to this interval. If monitor circuit 36 has asserted the fault signal at the time of start up, processor sets a timer to go back and check for the fault signal again after a period of time to allow for the capacitors in the array to settle and correct the imbalance. The timer may be set to 20 minutes, however, the subject technology is not limited to this period of time. If the fault signal is still asserted by monitor circuit 36 after the period of time, processor 12 reports a fault condition either directly to host device 16 or using the fault LED. During normal operation of storage device 10, processor 12 is configured to report the fault condition if the fault signal is asserted by monitor circuit 36 for a set number of consecutive sample periods. For example, if the fault signal is asserted by monitor circuit 36 for 10 consecutive sample periods, processor 12 may report a fault condition in the manner described above.

As noted above, test unit 34 is configured to apply a load across the capacitor array based on a signal set by processor 12. If the capacitor array fully charges at start up and monitor circuit 36 does not detect an imbalance among the capacitors, processor 12 sets a timer to conduct a test using test unit 34. For example, processor 12 may set the timer to 1 hour after the initial signal from voltage detector 30 indicated that the capacitor array is fully charged. The timer also may be set under the conditions where monitor circuit 36 does not currently detect an imbalance, but during the last sample period monitor circuit 36 did detect an imbalance and asserted the fault signal. Again, the timer may be set at 1 hour.

To test the capacitor array, processor 12 disables voltage regulator 28 to stop charging the capacitor array and test unit 34 is enabled to apply a load across the capacitor array. During the test, processor 12 monitors the output of voltage detector 30. If voltage detector 30 does not drop the signal indicating that the capacitor array is charged after a period of time, processor 12 reports a fault condition in the manner described above. The period of time may be 12 seconds, but the subject technology is not limited to this duration. This situation would indicate that the capacitor array is not discharging properly and may not be able to provide sufficient backup power. If voltage detector 30 does drop the signal after a period of time, processor 12 reports a successful test. However, if detector 30 drops the signal too soon, between 1 and 2 seconds for example (i.e., 1.3 seconds), corresponding to a rapid discharge of the capacitor array, a fault condition may be reported by processor 12.

Once the test is completed, voltage regulator 28 is once again enabled and the capacitor array is recharged. Processor 12 again monitors the output of voltage detector 30 to determine if the capacitor array is charging quickly enough.

Processor 12 may log the various events associated with the processes discussed above. For example, each time one of the signals is sampled or a fault report is generated, processor 12 may log an entry with various bits in the entry corresponding to different circumstances and/or results.

During normal operation, processor 12 may monitor another voltage detector detecting the voltage at the main power rail. If the voltage drops below a threshold, processor 12 would then turn on switch 32 and deactivate voltage regulator 28 to allow the capacitor array to discharge into the main power rail to provide power to components in storage device 10 to allow them to wind down.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology.

A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A solid state storage device comprising:
   a printed circuit board assembly;
   a memory arranged on the printed circuit board assembly;
   a storage medium arranged on the printed circuit board assembly;
   a processor arranged on the printed circuit board assembly, wherein the processor is coupled to the memory and to the storage medium via the printed circuit board assembly, and wherein the processor is configured to store data in the memory and the storage medium and to read data from the memory and the storage medium; and
   a removable power pack comprising a plurality of capacitors serially arranged in a housing, wherein the plurality of capacitors is detachably connected to the printed circuit board assembly to supply backup power to the processor, the memory, and the storage medium when the removable power pack is mounted in the solid state storage device.

2. The solid state storage device according to claim 1, wherein the housing comprises a plurality of cavities defined therein, and wherein each of the plurality of capacitors is arranged in a respective one of the plurality of cavities.

3. The solid state storage device according to claim 2, wherein the removable power pack further comprises a mounting circuit board connected to each of the plurality of capacitors, wherein the plurality of capacitors are serially connected to one another via the mounting circuit board, and wherein the mounting circuit board comprises a plurality of connectors configured to detachably connect to the printed circuit board assembly.

4. The solid state storage device according to claim 3, wherein the plurality of connectors comprises a plurality of pogo pins.

5. The solid state storage device according to claim 3, wherein the plurality of connectors comprises a plurality of contact pads.

6. The solid state storage device according to claim 3, wherein the housing and the mounting circuit board at least partially enclose the plurality of capacitors.

7. The solid state storage device according to claim 1, wherein the housing is formed of plastic.

8. The solid state storage device according to claim 1, further comprising:
   a frame base, wherein the printed circuit board assembly is attached to the frame base; and
   a frame cover attached to the frame base,
   wherein the frame base and the frame cover partially enclose the printed circuit board assembly, the memory, the storage medium, and the processor, and
   wherein the frame base and the frame cover define an opening for mounting the removable power pack in the solid state storage device.

9. The solid state storage device according to claim 1, further comprising a monitor circuit configured to monitor a voltage at a positive plate of each of the plurality of capacitors.

10. The solid state storage device according to claim 9, wherein the monitor circuit comprises an analog-to-digital convertor configured to convert the voltage at the positive plate of each of the plurality of capacitors to a respective digital value, and wherein the monitor circuit is further configured to communicate the respective digital values to the processor.

11. The solid state storage device according to claim 10, wherein the monitor circuit further comprises a plurality of voltage dividers configured to standardize the voltage at the positive plate of respective ones of the plurality of capacitors, wherein the monitor circuit is configured to monitor the respective standardized voltages.

12. The solid state storage device according to claim 1, further comprising an active balance network configured to equalize the respective voltages across the plurality of capacitors, wherein the active balance network comprises:
   a first plurality of resistors arranged in a first voltage divider circuit configured to equally divide the total voltage across the plurality of capacitors; and
   a plurality of op amps configured as voltage followers,
   wherein the output of each of the plurality of op amps is coupled to a respective terminal connecting two adjacent capacitors, and an input of each of the plurality of op amps is coupled to a respective terminal connecting two adjacent resistors in the first voltage divider circuit.

13. The solid state storage device according to claim 12, wherein the active balance network is further configured to bring the voltage at the positive plate of each of the plurality of capacitors to a respective cumulative percentage of the total capacity of the plurality of capacitors.

14. The solid state storage device according to claim 12, further comprising a passive balance network configured to equalize the respective voltages across the plurality of capacitors, wherein the passive balance network comprises:
   a second plurality of resistors arranged in second voltage divider circuit configured to equally divide the total voltage across the plurality of capacitors, wherein each of the second plurality of resistors is arranged in parallel with a respective one of the plurality of capacitors.

15. A solid state storage device comprising:
a printed circuit board assembly;
a memory arranged on the printed circuit board assembly;
a storage medium arranged on the printed circuit board assembly;
a processor arranged on the printed circuit board assembly, wherein the processor is coupled to the memory and to the storage medium via the printed circuit board assembly, and wherein the processor is configured to store data in the memory and the storage medium and to read data from the memory and the storage medium;
a plurality of capacitors serially arranged and connected to the printed circuit board assembly to supply backup power to the processor, the memory, and the storage medium; and
a monitor circuit configured to monitor a voltage at a positive plate of each of the plurality of capacitors.

16. The solid state storage device according to claim 15, wherein the monitor circuit comprises an analog-to-digital convertor configured to convert the voltage at the positive plate of each of the plurality of capacitors to a respective digital value, and wherein the monitor circuit is further configured to communicate the respective digital values to the processor.

17. The solid state storage device according to claim 16, wherein the monitor circuit further comprises a plurality of voltage dividers configured to standardize the voltage at the positive plate of respective ones of the plurality of capacitors, wherein the monitor circuit is configured to monitor the respective standardized voltages.

18. The solid state storage device according to claim 15, wherein the plurality of capacitors are serially arranged in a housing of a removable power pack, and wherein the plurality of capacitors are configured to be detachably connected to the printed circuit board when the removable power pack is mounted in the solid state storage device.

19. A solid state storage device comprising:
a printed circuit board assembly;
a memory arranged on the printed circuit board assembly;
a storage medium arranged on the printed circuit board assembly;
a processor arranged on the printed circuit board assembly, wherein the processor is coupled to the memory and to the storage medium via the printed circuit board assembly, and wherein the processor is configured to store data in the memory and the storage medium and to read data from the memory and the storage medium;
a plurality of capacitors serially arranged and connected to the printed circuit board assembly to supply backup power to the processor, the memory, and the storage medium; and
an active balance network configured to equalize the respective voltages across the plurality of capacitors, wherein the active balance network comprises:
a first plurality of resistors arranged in a first voltage divider circuit configured to equally divide the total voltage across the plurality of capacitors; and
a plurality of op amps configured as voltage followers, wherein the output of each of the plurality of op amps is coupled to a respective terminal connecting two adjacent capacitors, and an input of each of the plurality of op amps is coupled to a respective terminal connecting two adjacent resistors in the first voltage divider circuit.

20. The solid state storage device according to claim 19, wherein the active balance network is further configured to bring the voltage at the positive plate of each of the plurality of capacitors to a respective cumulative percentage of the total capacity of the plurality of capacitors.

21. The solid state storage device according to claim 19, further comprising a passive balance network configured to equalize the respective voltages across the plurality of capacitors, wherein the passive balance network comprises:
a second plurality of resistors arranged in second voltage divider circuit configured to equally divide the total voltage across the plurality of capacitors,
wherein each of the second plurality of resistors is arranged in parallel with a respective one of the plurality of capacitors.

22. The solid state storage device according to claim 19, wherein the plurality of capacitors are serially arranged in a housing of a removable power pack, and wherein the plurality of capacitors are configured to be detachably connected to the printed circuit board when the removable power pack is mounted in the solid state storage device.

* * * * *